United States Patent
Glomb et al.

(10) Patent No.: US 12,128,345 B2
(45) Date of Patent: Oct. 29, 2024

(54) SEPARATING METHOD FOR ALTERNATIVE GAS MIXTURES FOR USE AS INSULATING MEDIA

(71) Applicant: DILO ARMATUREN UND ANLAGEN GMBH, Babenhausen (DE)

(72) Inventors: Sebastian Glomb, Aachen (DE); Mathias Gestle, Kellmünz (DE)

(73) Assignee: DILO ARMATUREN UND ANLAGEN GMBH, Babenhausen (DE)

( * ) Notice: Subject to any disclaimer, the term of this patent is extended or adjusted under 35 U.S.C. 154(b) by 354 days.

(21) Appl. No.: 17/629,000

(22) PCT Filed: May 18, 2020

(86) PCT No.: PCT/EP2020/063858
§ 371 (c)(1),
(2) Date: Jan. 21, 2022

(87) PCT Pub. No.: WO2021/013403
PCT Pub. Date: Jan. 28, 2021

(65) Prior Publication Data
US 2022/0266190 A1    Aug. 25, 2022

(30) Foreign Application Priority Data
Jul. 22, 2019    (DE) .................... 10 2019 119 741.4

(51) Int. Cl.
*B01D 5/00*    (2006.01)
*B01D 1/00*    (2006.01)
(Continued)

(52) U.S. Cl.
CPC ........... *B01D 5/009* (2013.01); *B01D 1/0058* (2013.01); *B01D 1/0082* (2013.01); *B01D 1/28* (2013.01);
(Continued)

(58) Field of Classification Search
None
See application file for complete search history.

(56) References Cited

U.S. PATENT DOCUMENTS

2012/0096896 A1    4/2012    Patel et al.
2018/0135804 A1    5/2018    Sieber et al.

FOREIGN PATENT DOCUMENTS

CN    108140449 A    6/2018
CN    108355461 A    8/2018
(Continued)

OTHER PUBLICATIONS

International Search report issued in International Patent Application No. PCT/EP2020/063858, dated Aug. 18, 2020, along with an English translation thereof.
(Continued)

*Primary Examiner* — Gabriel E Gitman
(74) *Attorney, Agent, or Firm* — GREENBLUM & BERNSTEIN, P.L.C.

(57) ABSTRACT

A method is disclosed for recovering a useful gas from a gas mixture including a useful gas and at least one secondary gas. The gas mixture is first compressed and transferred into a pressure vessel where cooling occurs. Then, from the pressure vessel, a secondary-gas containing gas phase is removed and condensed useful gas is transferred into a purification vessel. In the purification vessel, the condensed useful gas is then purified. A plant is disclosed for recovering
(Continued)

Figure 1:
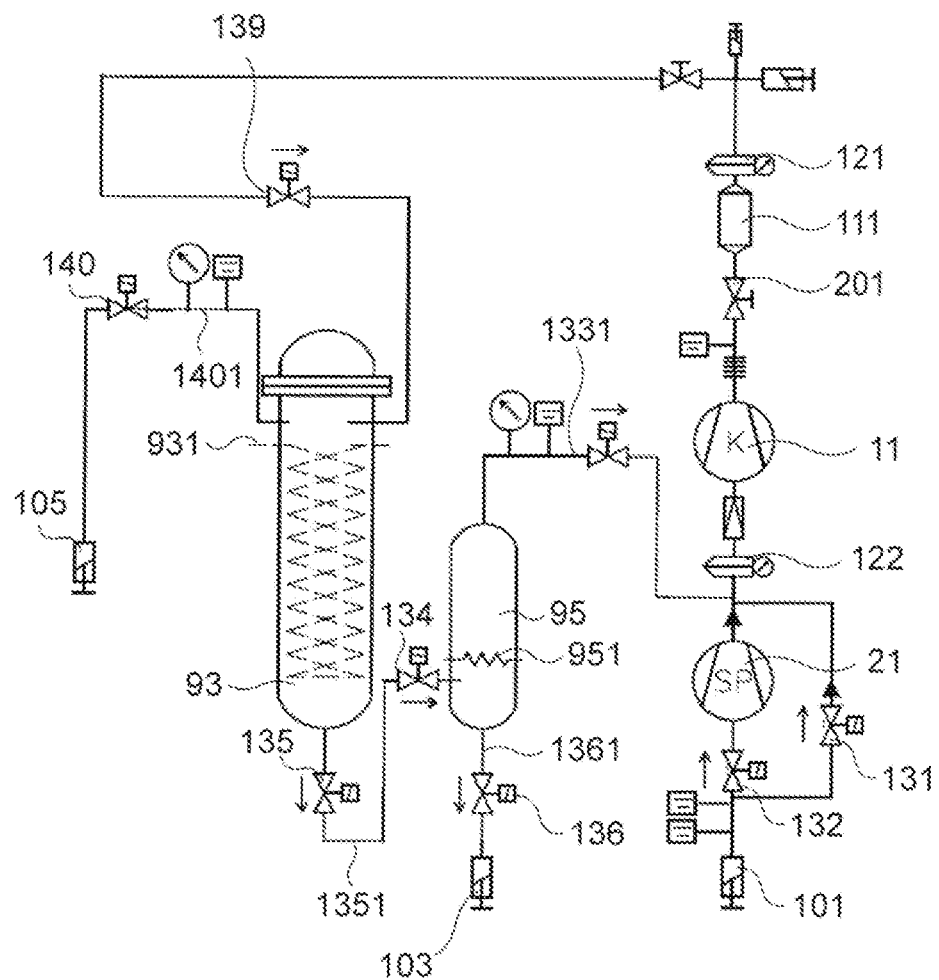

a useful gas from a gas mixture. Finally, the use of a plant for carrying out a method for recovering a useful gas from a gas mixture is disclosed.

10 Claims, 2 Drawing Sheets

(51) Int. Cl.
*B01D 1/28* (2006.01)
*B01D 53/00* (2006.01)

(52) U.S. Cl.
CPC ......... *B01D 5/0003* (2013.01); *B01D 5/0039* (2013.01); *B01D 5/0051* (2013.01); *B01D 5/006* (2013.01); *B01D 5/0075* (2013.01); *B01D 5/0093* (2013.01); *B01D 53/002* (2013.01); *B01D 2256/26* (2013.01); *B01D 2257/102* (2013.01); *B01D 2257/104* (2013.01); *B01D 2257/504* (2013.01); *B01D 2259/65* (2013.01)

(56) References Cited

FOREIGN PATENT DOCUMENTS

| | | |
|---|---|---|
| DE | 3122886 A1 | 1/1983 |
| DE | 102015108748 A1 | 12/2016 |
| JP | 2000-059934 A | 2/2000 |
| JP | 2009/099501 A | 5/2009 |
| JP | 2018-527872 A | 9/2018 |
| WO | WO-2017029338 A1 * | 2/2017 ........... B01D 53/002 |

OTHER PUBLICATIONS

Written Opinion of the International Searching Authority issued in International Patent Application No. PCT/EP2020/063858, dated Aug. 18, 2020.
Written Opinion from the Intellectual Property Office of Singapore (IPOS), dated Jul. 25, 2023, regarding Applicant's parallel Patent Application 11202114252V in Singapore.
Invitation to respond to the Written Opinion from the Intellectual Property Office of Singapore (IPOS), dated Jul. 25, 2023, regarding Applicant's parallel Patent Application 11202114252V in Singapore.
First Office action and machine translation of the parallel Japanese patent application No. 2022-502933, dated Nov. 30, 2023.
First Office action and machine translation of the parallel Chinese patent application No. 114007723-A (202080042528.9), dated Nov. 28, 2023.

* cited by examiner

SEPARATING METHOD FOR ALTERNATIVE GAS MIXTURES FOR USE AS INSULATING MEDIA

The invention relates to a method for recovering a usage gas from a gas mixture consisting of a usage gas and at least one secondary gas, wherein the gas mixture is firstly compressed and transferred into a pressure vessel where cooling occurs. A gas phase containing secondary gas is then taken from the pressure vessel and liquefied usage gas is transferred into a purification vessel. In the purification vessel, the liquefied usage gas is then heated and purified by drawing off a further gas phase. The invention further relates to a plant for recovering a usage gas from a gas mixture. Finally, the invention relates to the use of a plant for carrying out a method for recovering a usage gas from a gas mixture.

Gas mixtures are often used in industrial applications. After these gas mixtures have been used, it is usually necessary to separate them again into their individual gas constituents in order to dispose of the constituents or use them further.

Gas mixtures are used, for example, as protective gas for electric switching installations. In the past, a very common protective gas was SF6, which has very good insulating properties. However, SF6 damages the climate, and so in the recent past other protective or insulating gases which have technically similar properties to those of SF6 and are at the same time more environmentally friendly have been developed. These alternative protective or insulating gases are formed by gas mixtures. For example, such gas mixtures are based on C4-nitrile (2,3,3,3-tetrafluoro-2-(trifluoromethyl)propanenitrile) or C5-ketone (1,1,1,3,4,4,4-heptafluoro-3-(trifluoromethyl)butan-2-one). These gases on which gas mixtures for forming a protective or insulating gas are based will in the following be referred to as usage gases. To form a gas mixture as protective or insulating gas, one or more gases known as secondary gases are mixed into the usage gas. These secondary gases can be, for example, nitrogen or carbon dioxide. The mixing ratios between usage gas and secondary gas are matched to the application in which the gas mixture is employed. When such a gas mixture is used, for example, as insulating gas in a switching installation, these gas mixtures can become contaminated, for example when unwanted mixing with air occurs. In this case, a gas mixture containing further, unwanted components, which are also referred to as secondary gases, is formed.

There is therefore a need for solutions for separating gas mixtures consisting of a usage gas and at least one secondary gas back into their individual gas components. Firstly, it is necessary to free gas mixtures which have been unintentionally contaminated of the impurities. In addition, there is also a need to separate uncontaminated gas mixtures back into their individual components in order to produce fresh gas mixtures from the individual components, for example with different mixing ratios of the individual components relative to one another. There is a great need for such solutions especially in the field of protective and insulating gases for electric switching installations. However, gas mixtures have to be separated reliably and usage gases have to be recovered from gas mixtures in other technical fields too.

It is therefore an object of the invention to propose solutions for reliably separating gas mixtures into their individual components.

This object of the invention is achieved by a method for recovering a usage gas from a gas mixture consisting of a usage gas and at least one secondary gas, comprising at least the steps:
A) compression of the gas mixture in a compressor,
B) transfer of the compressed gas mixture into a pressure vessel,
C) cooling of the compressed gas mixture in the pressure vessel until the usage gas goes over into the liquid phase and a gas phase containing secondary gas remains, with the pressure in the pressure vessel being set so that it is at least twice as high as the vapor pressure of the usage gas at the prevailing temperature in the pressure vessel and the pressure in the pressure vessel is at least 5% lower than the vapor pressure of the secondary gas at the prevailing temperature in the pressure vessel,
D) removal of the gas phase containing secondary gas from the pressure vessel,
E) transfer of the liquefied usage gas from the pressure vessel into a purification vessel,
F) heating of the liquefied usage gas in the purification vessel,
G) extraction of the gas phase from the purification vessel until the internal pressure in the purification vessel corresponds to the vapor pressure of the usage gas at the prevailing temperature in the purification vessel.

The method of the invention is provided for separating a gas mixture and recovering a usage gas therefrom. The gas mixture consists of a usage gas and at least one secondary gas. However, the gas mixture usually comprises a plurality of secondary gases. The at least one secondary gas is left over as a result of the recovery of the usage gas from the mixture, so that a separation of the gas mixture is effected.

In a first method step, the gas mixture is compressed using a compressor. The gas mixture is compressed to a suitable pressure in this step. The method of the invention has the objective of liquefying the usage gas while leaving the secondary gas or gases in the gaseous phase. Separation by taking off either the gaseous secondary gas or the liquid usage gas is thus particularly simple. A suitable pressure which is set in the first method step by the compression should thus be selected so that the usage gas is suitably liquefied in a later method step, but the secondary gas or gases is/are not. The setting of such a suitable pressure is ideally effected exclusively by the initial compression in the compressor. As an alternative, an additional adaptation of the pressure, for example by further compression or depressurization, can be provided between the compressor and the pressure vessel or in the pressure vessel.

In a second method step, the compressed gas mixture is transferred into a pressure vessel. The pressure vessel is the place where a first fractionation of the gas mixture into its individual components takes place. The gas mixture is transferred under the pressure generated beforehand in the compression into the pressure vessel and is firstly temporarily stored there. Valves and devices for purifying the gas mixture, for example filters, are provided in the path between the compressor and the pressure vessel. The pressure vessel comprises a cooling unit which enables the pressure vessel and the gas mixture present therein to be cooled. The gas mixture present in the pressure vessel is then cooled. A combination of pressure and temperature at which the usage gas, which usually has a significantly lower vapor pressure than the secondary gas, liquefies is set in the pressure vessel. At the same time, the combination of pressure and temperature is set so that the secondary gas remains gaseous in the pressure vessel. A decisive factor in determining whether a gas is present in gaseous or liquid form is whether the prevailing pressure is above or below the vapor pressure of the corresponding gas. The vapor pressure in turn is dependent on the prevailing temperature. The condition or situation in which a gas goes over from the liquid state into the gaseous state can be referred to as the vapor pressure of this gas. Formulated in another way, this condition also corresponds to the condensation point at which a gas goes in the other direction from the gaseous state into the liquid state. The term vapor pressure is usually employed when a liquid phase and a gaseous phase are present together in an environment. Below the vapor pressure, a gas is gaseous in such an environment, and is liquid above the vapor pressure. A mixture of liquid and gaseous phases is not absolutely necessary for use of the term condensation point. Above the condensation point, a gas is always in the gaseous state. In this case, no phase of liquid gas has to be present. In the case of the presence of a purely gaseous phase, the property below the vapor pressure can thus be equated to the property above the condensation point. According to the invention, the gaseous gas mixture is compressed by the compression in the first step to a pressure which is below the vapor pressure of all gas components at the prevailing temperature. In this state, the gas mixture is introduced into the pressure vessel, with all components of the gas mixture being present in gaseous form. The temperature in the pressure vessel is then reduced. As a result of this reduction in the temperature, the vapor pressure of the gas components decreases. The temperature in the pressure vessel is reduced until the pressure prevailing in the pressure vessel is significantly higher than the vapor pressure of the usage gas at the temperature set. At this combination of pressure and temperature in the pressure vessel, the usage gas goes over into the liquid state. The pressure vessel is set so that it is at least twice as high as the gas pressure of the usage gas under the prevailing conditions in the pressure vessel. The pressure in the pressure vessel is for this reason set so as to be significantly higher than the gas pressure of the usage gas, which ensures that the usage gas is actually completely liquefied. In practice, it has been found that this complete liquefaction can be achieved particularly well at pressures in the pressure vessel which are 3-5 times the vapor pressure of the usage gas. The combination of pressure and temperature in the pressure vessel is at the same time set so that the pressure is at least 5% lower than the vapor pressure of the secondary gas. This spacing from the vapor pressure of the secondary gas ensures that said secondary gas reliably remains completely in the gaseous phase and does not partially liquefy. Depending on the type of secondary gas, this can also have absolutely no vapor pressure under the prevailing conditions in the pressure vessel. This is, for example, the case for a secondary gas which is formed by nitrogen. If such a secondary gas has no vapor pressure under the prevailing conditions, the pressure in the pressure vessel is low enough to ensure that the secondary gas remains in the gaseous phase. Other secondary gases, for example carbon dioxide, do have a vapor pressure under the prevailing conditions in the pressure vessel. In the case of such secondary gases, the pressure in the interior of the pressure vessel is preferably set so as to be from 5 to 40%, particularly preferably from 10 to 30%, lower than the vapor pressure of the secondary gas. As a result of this setting, a very large part of the secondary gas is separated out from the gas mixture. However, residues of the usage gas remain in the gaseous phase in the pressure vessel, and conversely residues of the secondary gas remain in the liquid phase which consists largely of usage gas.

After the first fractionation of the gas mixture in the pressure vessel, the gas phase containing secondary gas is removed from the pressure vessel. An appropriate removal conduit provided with a valve is advantageously provided in the upper region of the pressure vessel for this purpose.

In a further method step, the liquefied usage gas is transferred from the pressure vessel into a purification vessel. In this purification vessel, a second purification of the usage gas is carried out with the objective of removing residues of the secondary gas still present therein. This transfer of the usage gas into the purification vessel is usually driven by the pressure prevailing in the pressure vessel.

The purification vessel comprises at least one heating appliance which heats the purification vessel and the liquefied usage gas present therein. As a result of this heating in the purification vessel, the vapor pressure of the gases present therein increases relative to the conditions in the pressure vessel. Due to the increasing vapor pressure, the residues of the secondary gas still present in the liquefied usage gas go over into the gaseous phase and as a result leave the liquefied usage gas. At the same time, the solubility of the secondary gas or secondary gases in the liquid usage gas is reduced by the increasing temperature in the purification vessel, so that the secondary gases go over into the gas phase and leave the liquid usage gas and the usage gas is thus purified.

In a further method step, the gas phase containing the residues of the secondary gas which have been separated out is then drawn off from the purification vessel. In this extraction step, a pressure reduction can occur in the purification vessel. The extraction is carried out until the internal pressure in the purification vessel corresponds as minimum value to the vapor pressure of the usage gas at the prevailing temperature. The prevailing pressure in the purification vessel is thus always greater than or equal to the vapor pressure of the usage gas at the prevailing temperature in the vessel. In order to ensure thorough separation of usage gas and secondary gas, the internal pressure in the purification vessel is reduced down to the vapor pressure of the usage gas during the extraction. As a result, residues of secondary gas are separated out effectively from the usage gas. At pressures which are very close to the vapor pressure of the usage gas, the usage gas also begins to go over into the gaseous state. The gas phase drawn off from the purification vessel can thus also contain proportions of usage gas. According to the invention, however, setting of an internal pressure in the purification vessel very close to the vapor pressure of the usage gas is essential for good purity of the separated-out or recovered usage gas which is collected in liquefied form in the purification vessel. After conclusion on this method step, the usage gas is present in liquid form with a very high purity in the purification vessel. Recovery of the residues of the usage gas which are drawn off from the purification vessel is possible by means of optional embodiments of the method, as described further below.

In a particularly preferred embodiment, the method of the invention is carried out exactly in the sequence of the individual method steps as described above.

However, it is also possible to modify the order of the method steps if this leads to better results in the particular application.

Furthermore, the proposal advantageously provides for the gas mixture to be drawn off from a vessel in which the gas mixture is present in the particular application by means of a suction pump before the compression A). In this embodiment, the gas mixture is taken off from the vessel in which it is used industrially before compression. For example, such a vessel can be the housing of an electric switching installation in which the gas mixture is used as protective or insulating gas. A suction pump makes a very low extraction pressure possible. Such a low extraction pressure ensures that the usage gas, which usually has a very low vapor pressure, remains reliably in the gaseous phase during the extraction procedure. In the extraction of the gas mixture from the vessel, filters for purifying the extracted gas mixture can be installed before or after the suction pump. Gas mixtures used in a switching installation as protective or insulating gas can be drawn off directly from the switching installation and then be passed to the compression for carrying out the method of the invention. As an alternative, the extraction from the switching installation or the vessel by the suction pump can also occur into a buffer vessel. The gas mixture can in this case be fed in this buffer vessel to the compression for the method of the invention. An advantage of the temporary storage of the gas mixture in a buffer vessel is that the plant for carrying out the method of the invention can be located in a different place than the use of the gas mixture. In this case, the suction pump can be combined structurally with the buffer vessel or else be separate therefrom.

In a preferred embodiment of the proposal, the gas mixture is purified, in particular filtered, after the extraction step which is carried out using the suction pump. In this embodiment, the gas mixture is purified after extraction and before compression by the compressor. Various types of filters can be provided for the purification.

Furthermore, the extraction G) of the gas phase from the purification vessel is followed by dispensing of the purified usage gas remaining in the liquid phase in the purification vessel. In this embodiment, the purified usage gas which after the extraction of the gas phase collects at the bottom of the purification vessel is taken from the purification vessel and dispensed. Such dispensing can be effected into storage vessels, for example gas bottles. The recovered usage gas can then be taken in the storage vessel to a fresh use. For example, the storage vessel can be connected to a mixing plant in which the recovered usage gas is mixed into a fresh gas mixture.

In an advantageous embodiment, the gas mixture is dried and/or purified, in particular filtered, between the compression A) and the transfer B). In this embodiment, purification and/or drying of the gas mixture occurs between the compression and the pressure vessel. This purification and/or drying can be carried out before or during the transfer B) into the pressure vessel. Drying means that moisture or humidity present in the gas mixture is removed. Purification is usually carried out with the aid of filters. It is also possible to carry out a two-stage purification in which a first purification step is carried out before compression and a second purification step is carried out after compression.

It is judicious for the gas mixture to be compressed to a pressure of 5-20 bar, in particular 10 bar, in the compression A). This pressure range is particularly suitable for carrying out a method in which C4 or C5 is to be recovered as usage gas from a gas mixture. This pressure is significantly higher than the vapor pressure of the usage gas but significantly below the vapor pressure of the secondary gas at the temperatures prevailing in the pressure vessel. This pressure range is thus particularly suitable for a first separation of usage gas and secondary gas.

In a further preferred embodiment, the gas mixture is cooled to a temperature of from −30 to −60° C., in particular to a temperature of from −45 to −50° C., during the cooling step C) in the pressure vessel. This temperature range on cooling in the pressure vessel is, particularly in combination with the above-described preferred pressure range, particularly suitable for recovering C4 or C5 from a gas mixture. As indicated above, these parameters for cooling in the pressure vessel create conditions in which the pressure is significantly higher than the vapor pressure of the usage gas but the pressure is at the same time lower than the vapor pressure of the secondary gas. Under these conditions, the usage gas goes over reliably into the liquid state of matter while the secondary gas assumes a gaseous state.

Furthermore, it is advantageous for the cooling C) to be carried out for from 5 to 20 minutes, in particular 10 minutes. The cooling in the pressure vessel is usually carried out periodically. This means that gas mixture from the compression is firstly transferred into the pressure vessel. This transfer is subsequently interrupted and cooling is commenced. A time of from 5 to 20 minutes has been found to be particularly useful for creating states in the pressure vessel in which the usage gas is present in liquid form but the secondary gas is present in gaseous form. Of course, cooling can also be carried out for a time shorter or longer than the range indicated.

It is advantageous for the transfer B) of the gas mixture into the pressure vessel to be carried out periodically and for a disengagement time to be allowed to pass before the removal D) of the gas phase containing secondary gas from the pressure vessel. The transfer of the gas mixture into the pressure vessel is advantageously not carried out continuously but instead periodically. This means that transfer of the gas mixture from the compression into the pressure vessel is carried out in a first step. In a second step, the transfer is interrupted and cooling is carried out in the pressure vessel without further filling of the pressure vessel. After establishment of the desired parameters in the pressure vessel, a disengagement time is allowed to pass. During this disengagement time, the gaseous secondary gas present in the liquefied usage gas escapes in an upward direction and collects in gaseous form above the liquid usage gas. Without a disengagement time, relatively large residual amounts of gaseous secondary gas would be present in the liquid usage gas. After the disengagement time has been allowed to pass and the secondary gas has outgassed, the gas phase containing secondary gas is then taken from the pressure vessel.

Furthermore, the proposal advantageously provides for the gas phase containing secondary gas taken off in the removal D) to be disposed of or destroyed. Particularly in the case of protective or insulating gases, the secondary gas is not harmful to the environment or climate and at the same time is cheap to buy. In such a case, it is not worthwhile to reuse the secondary gas for further applications. Disposal or destruction is simpler and cheaper to carry out here.

In a preferred embodiment of the proposal, the transfer E) of the liquefied usage gas is carried out when the pressure vessel is filled to more than 0.75+/−20% kg/l with gas mixture. The filling and also the emptying or the transfer of the liquefied usage gas into the purification vessel are preferably carried out periodically. The transfer of the liquefied usage gas is advantageously carried out when a fill density of 0.75+/−20% kg/l, namely 0.75 kg/l with a tolerance of + or −20%, is present in the pressure vessel. At a higher fill density, insufficient space remains in the pressure vessel for collection of the gas phase containing secondary gas. At a lower fill density, only little liquid usage gas phase is present in the pressure vessel and the transfer is thus not efficient. The fill densities mentioned have been found to be suitable in practice. However, when the shape or size of the pressure vessel is altered, different ranges of the fill density can be optimal for commencement of the transfer of the liquefied usage gas.

Furthermore, the purification vessel is evacuated before the transfer E) of the liquefied usage gas. In this embodiment, the purification vessel is emptied or evacuated before the liquid usage gas phase is transferred from the pressure vessel. As a result, no counterpressure or only a very low counterpressure prevails in the purification vessel and the liquid usage gas phase can be transferred unhindered into the purification vessel. In addition, this ensures that the usage gas phase transferred is not contaminated by residue gas present in the purification vessel.

In an advantageous embodiment, the heating F) of the liquefied usage gas in the purification vessel is effected using an electrically operated heating appliance. In this embodiment, the heating is carried out using an electric or electronic heating appliance. The power of such heating appliances is particularly simple to regulate, which makes establishment of the conditions in the interior of the purification vessel particularly simple. One or more temperature sensors which are integrated into a regulating circuit for controlling the heating appliance are usually provided in the interior of the purification vessel.

In a further preferred embodiment, the heating F) of the liquefied usage gas in the purification vessel is effected by a heat exchanger as heating appliance which utilizes the waste heat arising during cooling C) of the compressed gas mixture in the pressure vessel and supplies it to the purification vessel. A heat pump is usually employed when cooling the gas mixture in the pressure vessel. This results in waste heat outside the pressure vessel and this can in turn be used advantageously for heating the usage gas in the purification vessel. Such a heat exchanger significantly reduces the overall energy consumption for carrying out the method of the invention and makes a plant for carrying out this method very energy-efficient.

Furthermore, it is advantageous for heating to be carried out by the heat exchanger and additionally by the electric heating appliance. In this embodiment, heating is effected by a combination of a heat exchanger with an electric heating appliance. A main part of the heating is advantageously carried out by the particularly energy-efficient heat exchanger. The fine regulation of the temperature in the purification vessel is carried out by an electric heating appliance which can be regulated virtually in real time and very finely. This fine regulation is important to set conditions under which the prevailing pressure is very close to the vapor pressure of the usage gas in the purification vessel. A combination of heat exchanger and electric heating appliance is thus energy-efficient and also very effective for clean isolation or recovery of the usage gas.

It is advantageous for the gas phase taken off from the purification vessel in the extraction step G) to be recirculated into the pressure vessel. The gas phase extracted from the purification vessel consists largely of secondary gas but still contains residual amounts of usage gas. To recover these residual amounts of usage gas, the gas phase is advantageously supplied to the method of the invention again. This preferably occurs by the gas phase being fed via a compressor or a pump back into the pressure vessel. Usage gas still present in the gas phase is then recovered in a second pass through the method. This recirculation of the gas phase from the purification vessel into the method brings about particularly effective recovery of the usage gas.

Furthermore, the proposal advantageously provides for the extraction G) of the gas phase from the purification vessel to be carried out using a compressor. In this embodiment, the extraction from the purification vessel is effected by a compressor which additionally compresses the gas phase drawn off. This extraction can either be carried out using the same compressor which is employed for the initial compression A) or, as an alternative, another or a further compressor can be used. The use of the same compressor as in the initial compression A) results in this compressor being utilized twice, which simplifies the structure of a plant for carrying out the method.

In a preferred embodiment of the proposal, the dispensing H) of the purified usage gas remaining in the liquid phase in the purification vessel involves said usage gas being dispensed into an evacuated pressure vessel. The prior evacuation of the pressure vessel into which the purified usage gas is to be dispensed ensures that the usage gas is not contaminated again. At the same time, no counterpressure or only a very small counterpressure prevails in the pressure vessel provided for dispensing in this embodiment, which makes dispensing simple and efficient.

Furthermore, the vapor pressure curve of the usage gas runs below the vapor pressure curve of the secondary gas. The method of the invention is particularly suitable for the separation of gas mixtures in which the usage gas to be recovered has a lower vapor pressure and/or higher condensation point than the secondary gas. The recovery or separation of the gas mixture is based on this difference in the vapor pressure. In the field of electric switching installations, gas mixtures containing C4 or C5 as usage gas are often employed as protective or insulation gases. These two gases both have a very low vapor pressure which is significantly lower than the vapor pressure of customarily used secondary gases, for example nitrogen or carbon dioxide. Nitrogen has virtually no vapor pressure above the critical temperature. The condensation point of the usage gas is in this case higher than the condensation point of nitrogen.

In an advantageous embodiment, the internal pressure and the temperature in the treatment vessel are measured continuously by sensors during the extraction G) of the gas phase from the purification vessel and a control based on the measured values from these sensors stops the extraction G) as soon as the vapor pressure of the usage gas has been attained in the purification vessel. The extraction of the gas phase from the purification vessel is carried out until the internal pressure in the vessel corresponds to the vapor pressure of the usage gas under the conditions prevailing there. For recovery of a very pure usage gas, it is important that the internal pressure in the purification vessel is brought very close to the vapor pressure of the usage gas. Automatic, electronic regulation of the internal pressure is thus advantageous. For this purpose, one or more pressure and/or temperature sensors are provided in the treatment vessel. The measured values from these sensors are used for electronic regulation of the extraction of the gas phase and for regulation of the heating appliance and the temperature in the treatment vessel.

It is judicious for the transfer B) of the compressed gas mixture into the pressure vessel to be carried out periodically or continuously. As indicated above, this transfer is advantageously carried out periodically. In this case, the pressure vessel is filled at one time and at another time during which no filling takes place the contents of the pressure vessel are cooled and the gas mixture is separated in this way. However, as an alternative, it is also possible for filling of the pressure vessel and thus also the taking-off of the separated gas phases to be made continuous. Such a continuous process increases the time efficiency of such plants. Since a continuous process incurs additional expense, it is economically viable mainly for large plants.

In a further preferred embodiment, the transfer E) is driven by the pressure prevailing in the pressure vessel. In this embodiment, the transfer of the liquefied usage gas from the pressure vessel into the purification vessel is driven by the pressure prevailing in the pressure vessel. This embodiment is particularly effective in combination with a previous evacuation of the purification vessel. In this way, no additional plant components such as pumps or the like have to be provided for transfer of the liquid usage gas phase. The heating in the purification vessel results in the vapor pressure of the usage gas there increasing compared to the vapor pressure at room temperature. The usage gas can thus be transferred in the liquid phase from the cooled pressure vessel into the heated purification vessel. As an alternative, it is of course also possible, in particular, to provide supplementary plant components which carry out the transfer into the purification vessel. For example, the compressor which is in any case present could be used for assisting the transfer of the liquid phase into the purification vessel.

The object of the invention is likewise achieved by a plant for recovering a usage gas from a gas mixture, wherein the plant comprises at least the following components:
  a compressor for compressing the gas mixture,
  a pressure vessel for accommodating the compressed gas mixture,
  where the pressure vessel has a cooling unit, i.e., or simply "cooler", for cooling the compressed gas mixture
  and the pressure vessel has a removal conduit for the gas phase containing secondary gas
  and the pressure vessel is connected via a transfer conduit to a purification vessel, which conduit serves to transfer the liquefied usage gas,
  where the purification vessel is provided with a heating appliance for heating the liquefied usage gas,
  an extraction unit, i.e., or simply an extractor", which is located on an extraction conduit and draws off the gas phase from the purification vessel
  and also a dispensing conduit and
  purified usage gas can be dispensed via the dispensing conduit.

A plant according to the invention is suitable and provided for carrying out the method of the invention and recovering a usage gas from a gas mixture. At this juncture, it may be expressly pointed out that disclosures which are made with regard to the plant components in the description of the method of the invention are also disclosed in the context of the plant according to the invention.

The plant of the invention comprises a compressor which is provided for compressing the gas mixture and feeding it to the pressure vessel. The compressor is connected via at least one connecting conduit to the pressure vessel. The first separation of the gas mixture takes place in the pressure vessel. The pressure vessel comprises a cooling unit which is provided for cooling the contents of the pressure vessel. In addition, the pressure vessel comprises a removal conduit which is provided for removing the gas phase containing secondary gas from the pressure vessel. The removal conduit is connected in the upper region of the pressure vessel, with this connection being located above the liquid surface of the liquefied usage gas phase. In addition, the pressure vessel comprises a transfer conduit which leads to the purification vessel. The transfer conduit is provided for taking the liquid usage gas phase from the pressure vessel and transferring it into the purification vessel. The transfer conduit is connected to the pressure vessel in the lower region below the liquid surface of the usage gas phase. The plant of the invention further comprises the abovementioned purification vessel which is provided for carrying out a second separation of the gas mixture. The usage gas transferred from the pressure vessel still contains residues of secondary gas which are very largely removed from the usage gas in the purification vessel. A purity of the recovered usage gas of more than 99% is possible when using a plant according to the invention. The purification vessel comprises a heating appliance which is provided for heating the contents of the purification vessel. This heating appliance can comprise a plurality of components, for example an electrically operated component and a component which is connected to a heat exchanger which utilizes the waste heat of the cooling from the pressure vessel. Furthermore, the purification vessel comprises at least one extraction unit having at least one extraction conduit. The extraction unit is provided for taking the gas phase containing secondary gas from the purification vessel. To take off the recovered, purified usage gas, at least one dispensing conduit is connected to the purification vessel. The recovered usage gas is taken off from the plant according to the invention via this dispensing conduit.

A plant according to the invention consists of reliable engineering components and has a simple construction. A plant according to the invention is thus very reliable and makes it possible to recover usage gas having a very high purity.

A regulating unit, i.e., or simply, a "regulator", which draws off the gas phase from the purification vessel until the internal pressure in the purification vessel corresponds to the vapor pressure of the usage gas at the prevailing temperature in the purification vessel is preferably provided on the extraction unit. In this embodiment of the plant, an electronic or computer-controlled regulating unit which regulates the conditions, in particular pressure and temperature, in the purification vessel is provided. This regulating unit uses measured values from sensors arranged in the interior of the purification vessel as input. As output, the regulating unit influences the extraction of the gas phase from the purification vessel. For this purpose, the regulating unit can, for example, influence the opening of a valve in the extraction conduit. An analogous regulating unit can also be provided on the pressure vessel in order to regulate the removal of the gas phase containing secondary gas there. The regulating unit can be formed by a plant control system or be part of a plant control system.

Furthermore, at least one pressure or temperature sensor which is connected to a plant control system is advantageously provided on the pressure vessel. In this embodiment, at least one pressure or temperature sensor which is connected to a plant control system or a regulating unit is arranged at least on the pressure vessel, but advantageously also on the purification vessel. It is advantageous for a plurality of pressure and temperature sensors which forward their measured values as input into an automatic regulation of the conditions in the pressure vessel and/or in the purification vessel to be provided.

A plant for recovering a usage gas from a gas mixture can be operated particularly efficiently using a plant control system. This plant control system is provided for operating the plant at least partly automatically. Apart from the above-described sensors for determining pressure or temperature, further sensors are optionally also provided. Thus, flow sensors which determine the mass flows and communicate these to the plant control system can be provided, for example, in the conduits from the compressor to the pressure vessel, from the pressure vessel to the purification vessel and/or from the purification vessel back to the compressor. In addition, sensors for determining the mass or the weight of the gas mixture in the pressure vessel and in the purification vessel can be provided. From the measured values determined by these sensors, the plant control system can then automatically also determine the density in the vessels. The plant control system is likewise provided for calculating the vapor pressures of the individual components, especially in the pressure vessel and in the purification vessel, in real time and regulating the internal pressures and the temperatures according to the requirements of the method. Furthermore, the plant control system can act on the various valves which are required for conducting the gas mixture through the plant or for taking off the separated components. Finally, sensors which determine the humidity and the contamination of the gas mixture by particles can be provided. Based on the signals from these sensors, the plant can then automatically determine whether drying or purification of the gas mixture should be carried out and for this purpose exert an influence on filters and/or drying units.

In a further embodiment, sensors can be arranged in the removal conduit for taking the gas phase containing secondary gas from the pressure vessel, which sensors monitor the amount of usage gas remaining in this gas phase which has been taken off. On the basis of the signals from these sensors, the gas phase which has been taken off can then be discharged into the atmosphere for disposal when the usage gas concentration is low. If the usage gas concentration is too high, the gas phase can be returned to the method in order to remove the remaining residues of usage gas or at least reduce them.

Furthermore, sensors which determine the composition of the gas mixture, in particular the proportion of usage gas, the proportion of secondary gas and the purity of these gases, can be arranged downstream of the connection via which the gas mixture to be separated is fed to the plant or the method. On the basis of the signals from these sensors, the plant control system can then determine the maximum amount of gas mixture which can be fed to the plant or the method for purification. This determination of the gas composition can of course also be carried out continuously and the plant control system can likewise continuously regulate the amount of gas mixture taken up on the basis of the signals determined.

The object of the invention is likewise achieved by the use of a plant according to one of the above-described embodiments for recovering the usage gas C4-nitrile (2,3,3,3-tetrafluoro-2-(trifluoromethyl)propanenitrile) and/or C5-ketone (1,1,1,3,4,4,4-heptafluoro-3-(trifluoromethyl)butan-2-one) from a gas mixture comprising at least one or more of the following secondary gases: oxygen, nitrogen and/or carbon dioxide, in particular with implementation or use of the method according to one of the above-described embodiments. A plant according to the invention is particularly suitable for carrying out a method according to the invention. The usage gases C4-nitrile, also denoted by the CAS number 42532-60-5, and C5-ketone, also denoted by the CAS number 756-12-7, both have a very low vapor pressure. This vapor pressure is significantly lower than the vapor pressure of typical secondary gases in gas mixtures which are used as protective or insulating gas, for example nitrogen or carbon dioxide. A plant according to the invention is made up of simple components and is very suitable for separating gas mixtures in which the individual components have different vapor pressures efficiently and with high purity. In addition, a plant according to the invention can have a very compact construction, so that it can be operated as mobile plant.

In this context, it is pointed out, in particular, that all features and properties and also procedures described in respect of the plant can also be transferred analogously to the formulation of the method of the invention and are usable and also considered to be disclosed in the context of the invention. The same also applies conversely, i.e. structural, that is to say apparatus, features mentioned only in relation to the method can also be taken into account and claimed within the scope of the apparatus or plant claims and are likewise considered to be part of the disclosure.

Figure 2:
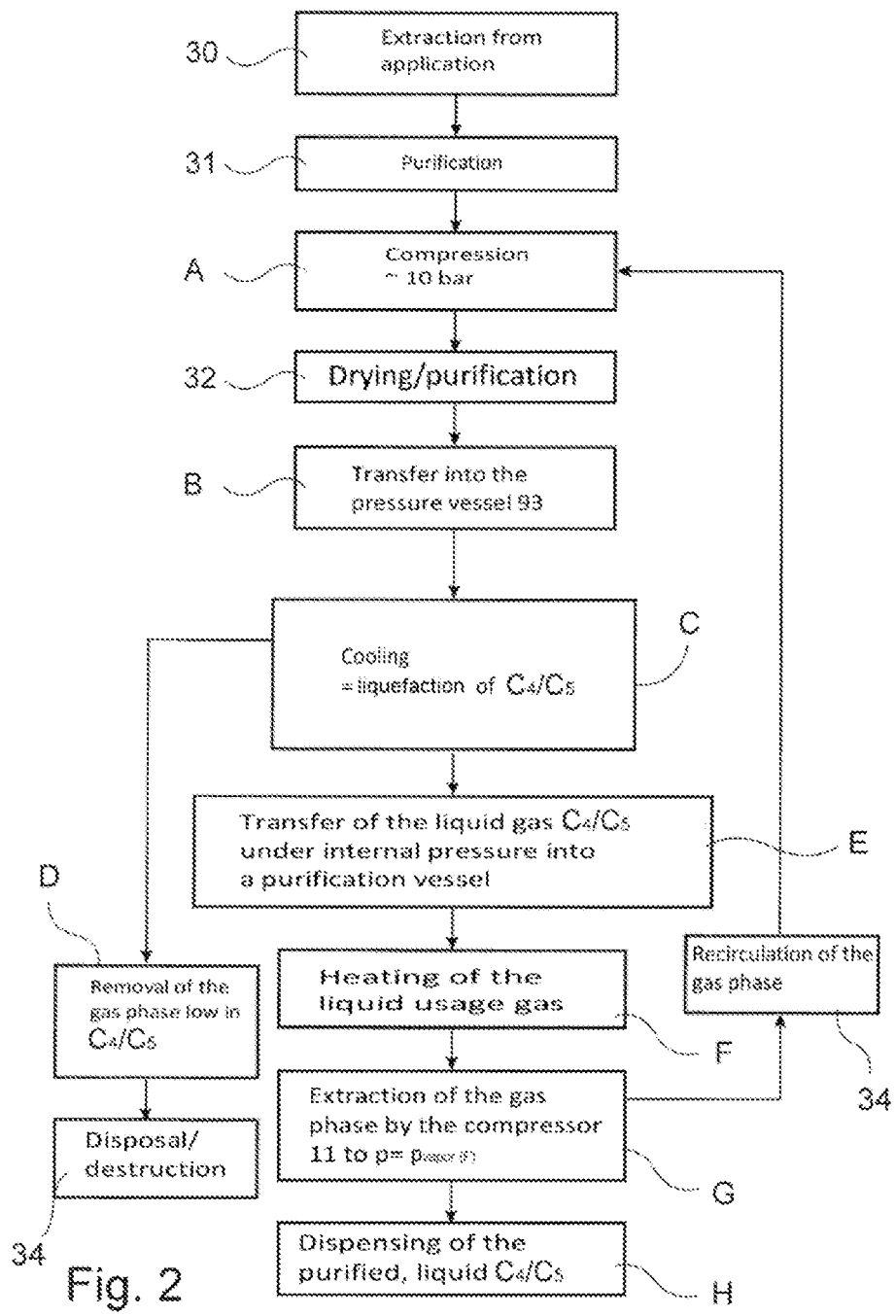

In the drawings, the invention is schematically illustrated, in particular, in a working example. In the drawings:

FIG. 1 shows a schematic depiction of an embodiment of a plant according to the invention, FIG. 2 shows a block diagram of an embodiment of a method according to the invention.

In the figures, identical or corresponding elements are each denoted by the same reference numerals and are therefore not described again, unless this is purposeful. The disclosures in the entirety of the description apply analogously to identical parts having the same reference numerals or the same component designations. The positional indications selected in the description, e.g. above, below, at the side, etc., relate to the figure directly described and depicted and, in the case of a positional change, can be applied analogously to the new position. Furthermore, individual features or combinations of features from the various working examples shown and described can in themselves represent independent inventive solutions or solutions according to the invention.

FIG. 1 shows a schematic depiction of an embodiment of a plant according to the invention. At the far bottom right, it is possible to see a connection 101 via which a gas mixture to be separated can be fed to the plant. The connection 101 can be connected directly to an application, for example an electric switching installation. As an alternative, a transport vessel for a gas mixture, for example a gas bottle, can also be connected to the connection 101. From the connection 101, a connecting conduit leads to the suction pump 21. This connecting conduit can be opened and closed by the valve 132. A bypass conduit leads from the connection 101 around the suction pump 21. The suction pump 21 can be circumvented via this bypass conduit. The bypass conduit can be opened and closed by the valve 131. The plant thus offers the opportunity of drawing in gas mixture from the connection 101 by means of the suction pump 21 or, as an alternative, feeding the gas mixture via the bypass conduit to the next plant components or method steps under the pressure prevailing outside the plant. The setting of the route from the connection 101 to be selected can be effected via the valves 132 and 131. A filter 122 can be seen downstream of the suction pump 21 or of the bypass conduit. The gas mixture can be purified in this filter and suspended material present in the gas mixture, for example, can be removed. The compressor 11 is arranged downstream of the filter 122. This compressor 11 draws in gas mixture from the upstream conduit and compresses this gas mixture. When the plant is operated, the compressor 11 is preferably regulated so that the pressure is already set after the compressor 11 so that the desired liquefaction of the usage gas occurs after the gas mixture is conveyed further into the pressure vessel 93. In practice, an exit pressure from the compressor 11 set at 5-20 bar, preferably 10 bar, has been found to be particularly suitable. Downstream of the compressor, there is a further valve 201 and a further filter 121 in a connecting conduit. The valve 201 makes it possible to open and close the conduit leading away from the compressor 11. The filter 121 is provided for purifying the previously compressed gas mixture. In the conduit running downstream of the compressor 11, a drying unit by means of which moisture is removed from the gas mixture can additionally be provided.

From the filter 121, a connecting conduit, which can be opened and closed by the valve 139, runs to the pressure vessel 93. This valve 139 thus makes it possible to determine whether gas mixture is or is not fed to the pressure vessel 93. Filling of the pressure vessel usually occurs periodically, i.e. the valve 139 is opened part of the time and closed part of the time. Control of this valve 139 can be effected by a plant control system. Of course, the valve 139 can also be opened or closed manually. The pressure vessel 93 has a longitudinal shape, with the longest dimension thereof being oriented essentially vertically. The conduit running from the valve 139 to the pressure vessel 93 is connected to the latter in the upper region, in particular in the upper third, of the pressure vessel 93. The pressure vessel 93 is pressure-tight and pressure-rated. The pressure vessel 93 comprises a cooling unit 931 which cools the pressure vessel and the gas mixture present therein. In the drawing, the cooling unit 931 is represented by a zig-zag pattern. In reality, helical or spiral cooling conduits are advantageously arranged in the pressure vessel 93 over a large part of the length of the pressure vessel 93. This ensures that the pressure vessel 93 and the contents thereof are cooled uniformly and effectively. The cooling unit 931 preferably cools the contents of the pressure vessel 93 to a temperature in the range from −30 to −60° C., particularly preferably to a range from −45 to −50° C. A removal conduit 1401 is likewise connected to the pressure vessel 93 in the upper third. This removal conduit 1401 serves to remove gas phase containing secondary gas formed in the pressure vessel 93 from the pressure vessel 93. To control or regulate this removal, the valve 140 is arranged in the removal conduit 1401. The removal conduit 1401 ends at the connection 105. The connection 105 is provided for connection to a vessel via which the gas phase containing secondary gas can be removed from the plant. The gas phase containing secondary gas which is taken off can then either be disposed of or reused. A transfer conduit 1351 which can be opened and closed by the two valves 135 and 134 is connected to the lowest point of the pressure vessel 93. The transfer conduit 1351 connects the pressure vessel 93 to the purification vessel 95 which is depicted to the right next to the pressure vessel. In the schematic view in FIG. 1, the purification vessel 95 is shown smaller than the pressure vessel 93. However, it has been found in practice that the plant functions optimally when the pressure vessel and the purification vessel 95 have about the same size. The liquefied usage gas is transferred from the pressure vessel 93 via the transfer conduit 1351 into the purification vessel 95. A first separation step for separating usage gas and secondary gas is carried out in the pressure vessel 93. However, the usage gas taken off from the pressure vessel 93 still comprises residues of secondary gas which are removed in the purification vessel 95. A second separation step of usage gas and secondary gas thus takes place in the purification vessel 95.

The purification vessel 95 comprises a heating appliance 951 which heats the purification vessel 95 and the gas present therein. Control or regulation of the heating appliance 951 is preferably effected via a plant control system. In the embodiment depicted, the heating appliance 951 is configured as an electric heating appliance. However, other types of heating appliances 951, for example a heat exchanger which utilizes the waste heat from the cooling unit 931 of the pressure vessel 93, can be used as an alternative. The previously prepurified, liquid usage gas is heated in the purification vessel 95. The pressure in the purification vessel 95 is regulated so that this internal pressure is very close to the vapor pressure of the usage gas under the conditions prevailing in the purification vessel 95. The internal pressure is selected so as to be slightly greater than this vapor pressure. As a result, residues of secondary gas which are present in the liquid usage gas outgas from the liquid usage gas because of their significantly higher vapor pressure. The residues of secondary gas then collect in gaseous form in the upper region of the purification vessel 95. To remove this collected secondary gas, an extraction conduit 1331 is connected at the top of the purification vessel 95. This extraction conduit 1331 can be opened and closed by the valve 133. When the gaseous secondary gas is extracted from the purification vessel 95, the pressure in the interior of the purification vessel 95 is reduced. The plant is regulated so that the internal pressure in the purification vessel 95 is not less than the vapor pressure of the usage gas. A dispensing conduit 1361 which can be opened and closed by the valve 136 is connected to the purification vessel 95 at the bottom. The connection 103 is provided at the end of this dispensing conduit 1361. At the connection 103, the usage gas which has previously been recovered and purified in two stages is removed from the plant. For this purpose, for example, a pressure vessel into which the liquid usage gas is dispensed can be connected at the connection 103. The recovered usage gas can subsequently be passed to its further use with the aid of this pressure vessel.

The extraction conduit 1331 connects the purification vessel 95 to the conduit which connects the suction pump 21 and the bypass conduit around the suction pump 21 to the compressor 11. The gas phase which has been drawn off from the purification vessel 95 can be fed back to the compressor 11 via the extraction conduit 1331. The extracted gas phase contains residues of usage gas. As a result of the recirculation of the extracted gas phase from the purification vessel 95 to the compressor 11, this gas phase, which is also a gas mixture, is fed once again to the separation steps in the pressure vessel 93 and in the purification vessel 95. This recirculation ensures that the residues of usage gas remaining in the gas phase after a first purification are recovered in a further pass through the method. Virtually complete recovery of the usage gas from the gas mixture is thus possible. Whether the compressor 11 draws in and compresses gas mixture supplied via the connection 101, a gas phase recirculated via the extraction conduit 1331 or a mixture of the two and feeds same into the pressure vessel 93 can be set with the aid of the valves 133, 131 and 132. This setting of which gas mixtures are compressed and transported by the compressor 11 is advantageously carried out automatically by a plant control system. The plant control system makes recourse to the signals of a plurality of different sensors which are arranged in various places in the plant.

FIG. 2 shows a block diagram of an embodiment of a method according to the invention. An embodiment of the method of the invention is depicted as a flow diagram in FIG. 2. At the beginning of the method, an extraction 30 from the application in which the gas mixture to be separated is present is performed. This extraction can occur either directly from the application or from a buffer vessel with the aid of which the gas mixture is transported from the actual application to the plant in which the method of the invention is carried out. The extraction 30 can, for example, as described above, be effected with the aid of a suction pump 21. The extraction is followed by a purification 31 in which contamination and moisture are removed from the gas mixture. This purification 31 represents an optional method step which can also be omitted in the case of a suitably pure gas mixture. A compression A which is preferably effected by a compressor takes place in the next step. In the compression A, the gas mixture is compressed, preferably to a pressure of about 10 bar. In this compression A, all components, i.e. usage gas and secondary gas(es), leave the compressor 11 in gaseous form and no liquefaction takes place yet. However, it is possible for parts of the usage gas to liquefy downstream of the compressor 11, where there are conduits and components which are at room temperature, and for these parts of the usage gas to go in liquefied form into the pressure vessel 93. A further optional drying/purification 32 takes place after the compression A. This drying/purification 32 can also be omitted in the case of a suitably pure gas mixture. The purity of the gas mixture is advantageously determined by sensors during the extraction 30 and before or after the compression A and the steps of purification 31 and drying/purification 32 are then carried out only if required on the basis of the sensor signals. The transfer B of the gas mixture into the pressure vessel 93 in which a first separation of the gas mixture occurs subsequently takes place. This separation is performed with the aid of the cooling C in the pressure vessel 93. The gas mixture present in the pressure vessel 93 is cooled to a preferred temperature in the range from −45° to −50° C. At this temperature and the pressure previously set by the compression A, the usage gas then liquefies. The usage gas can be, for example, C4-nitrile or C5-ketone, which both have a very low vapor pressure. During the cooling C, the internal pressure in the pressure vessel 93 is set or regulated so that it is significantly greater than, in particular at least twice, the vapor pressure of the usage gas and is at the same time significantly lower, in particular 5-40% lower, than the vapor pressure of the secondary gas. As a result, most of the secondary gas goes over into the gaseous phase while the usage gas liquefies and collects in the pressure vessel 93. The gas phase containing secondary gas is removed from the pressure vessel 93 in the removal D. In this way, most of the secondary gas is separated off from the gas mixture. The phase containing secondary gas which is taken off is subsequently removed from the method by the disposal/destruction 33. A transfer E of the liquid usage gas from the pressure vessel 93 into the purification vessel 95 takes place subsequent to or in parallel with the removal D. This transfer E is preferably effected solely by the pressure prevailing in the pressure vessel 93, which pressure drives the liquid usage gas further into the purification vessel 95. The subsequent heating F of the liquid usage gas is performed by a heating appliance 951 in the purification vessel 95. The liquid usage gas is here heated to a temperature of from about 0 to 20° C. After or during the heating F, an extraction G of the gas phase from the purification vessel 95 is performed. Heating F and extraction G are regulated so that the internal pressure in the purification vessel 95 is slightly greater than the vapor pressure of the usage gas under the conditions prevailing in the purification vessel 95. The internal pressure in the purification vessel 95 is thus significantly closer to the vapor pressure of the usage gas than the internal pressure in the pressure vessel 93. Due to this internal pressure in the purification vessel 95 which is close to the vapor pressure, the last residues of secondary gas still present in liquid form in the usage gas are effectively transferred into the gaseous phase and removed from the gas mixture by the extraction F. The usage gas thus remains in liquid form with a very high purity at the bottom of the purification vessel 95. A purity of >99% can be achieved with the aid of the method of the invention. From the purification vessel 95, the purified, liquid usage gas is taken off in the dispensing step H. The gas phase taken off from the purification vessel 95 in the extraction step G still contains residues of usage gas. To recover these last residues of usage gas, the gas phase is once again fed via the recirculation 34 to the compression A and the subsequent method steps. The last residues of usage gas are thus recovered in a second pass through the method, as a result of which the method displays a very high recovery rate.

The claims filed at present with the application and later are without prejudice for obtaining further protection.

Should it be established on closer examination, in particular also of the relevant prior art, that one or other feature may be useful for achieving the object of the invention but is not critically important, it goes without saying that a formulation which no longer has such a feature, in particular in the main claim, is envisaged even at this juncture. Such a sub-combination is also covered by the disclosure of the present application.

Furthermore, it should be noted that the embodiments and variants of the invention described in the various illustrative forms and shown in the figures can be combined with one another in any way. Here, individual features or a plurality of features can be exchanged as desired. These combinations of features are likewise disclosed.

The back-references given in the dependent claims refer to the further development of the subject matter of the main claim through the features of the respective dependant claim. However, these should not be interpreted as a renouncement of the attainment of independent, material protection for the features of the dependant claims which refer back to the main claim.

Features which have been disclosed only in the description or else individual features from the claims which encompass a plurality of features can at any time be taken up into the independent claim/claims as having a significance essential to the invention for delineating the invention from the prior art, even when such features have been mentioned in connection with other features or achieve particularly advantageous results in connection with other features.

LIST OF REFERENCE NUMERALS

11 Compressor
21 Suction pump
30 Extraction
31 Purification
32 Drying/purification
33 Disposal/destruction
34 Recirculation
93 Pressure vessel
95 Purification vessel
101 Connection
103 Connection
105 Connection
121 Filter
122 Filter
131 Valve
132 Valve 133 Valve
134 Valve
135 Valve
136 Valve
139 Valve
140 Valve
201 Valve
931 Cooling unit
951 Heating appliance
1331 Extraction conduit
1351 Transfer conduit
1361 Dispensing conduit
1401 Removal conduit

The invention claimed is:

1. A method for recovering a usage gas from a gas mixture consisting of a usage gas and at least one secondary gas, comprising at least the following:
   A) compression of the gas mixture in a compressor,
   B) transfer of the compressed gas mixture into a pressure vessel,
   C) cooling of the compressed gas mixture in the pressure vessel until the usage gas goes over into the liquid phase and a gas phase containing the at least one secondary gas remains, with the pressure in the pressure vessel being set so that it is at least twice as high as the vapor pressure of the usage gas at the prevailing temperature in the pressure vessel and the pressure in the pressure vessel is at least 5% lower than the vapor pressure of the at least one secondary gas at the prevailing temperature in the pressure vessel,
   D) removal of a first portion of the gas phase containing the at least one secondary gas from the pressure vessel,
   E) transfer of the liquefied usage gas from the pressure vessel into a purification vessel,
   F) heating of the liquefied usage gas in the purification vessel,
   G) extraction of a second portion of the gas phase from the purification vessel until the internal pressure in the purification vessel corresponds to the vapor pressure of the usage gas at the prevailing temperature in the purification vessel.

2. The method as claimed in claim 1, wherein the transfer B) of the compressed gas mixture into the pressure vessel is carried out periodically and a disengagement time is allowed to pass before the removal D) of the first portion of the gas phase containing the at least one secondary gas from the pressure vessel.

3. The method as claimed in claim 1, wherein the heating F) of the liquefied usage gas in the purification vessel is effected by a heat exchanger as a heating appliance which utilizes waste heat arising during the cooling C) of the compressed gas mixture in the pressure vessel and supplies it to the purification vessel.

4. The method as claimed in claim 1, wherein the second portion of the gas phase extracted from the purification vessel during the extraction G) is recirculated to the pressure vessel.

5. The method as claimed in claim 1, wherein the vapor pressure curve of the usage gas runs below the vapor pressure curve of the at least one secondary gas.

6. The method as claimed in claim 1, wherein the internal pressure and the prevailing temperature in the purification vessel are measured continuously by sensors during the extraction G) of the gas phase from the purification vessel and a control based on the measured values from these sensors stops the extraction G) as soon as the vapor pressure of the usage gas has been attained in the purification vessel.

7. The use of a plant for recovering the usage gas C4-nitrile (2,3,3,3-tetrafluoro-2-(trifluoromethyl) propanenitrile) and/or C5-ketone (1,1,1,3,4,4,4-hetpafluoro-3-(trifluoromethyl) butan-2-one) from a gas mixture comprising at least one or more of the following secondary gases: oxygen, nitrogen and/or carbon dioxide according to the method of claim 1.

8. A plant for recovering a usage gas from a gas mixture, wherein the plant comprises at least the following components:
   a compressor for compressing the gas mixture,
   a pressure vessel for accommodating the compressed gas mixture,
   wherein the pressure vessel has a cooler for cooling the compressed gas mixture,
   and the pressure vessel has a removal conduit for a gas phase of the cooled compressed gas mixture containing a secondary gas from the gas mixture
   a purification vessel connected to the pressure vessel via a transfer conduit, said transfer conduit being arranged for transferring a liquefied usage gas formed by the compression of the usage gas from the pressure vessel,
   wherein the purification vessel is provided with a heating appliance for heating the liquefied usage gas,
   an extractor located on an extraction conduit of the purification vessel for drawing off a second gas phase formed from the heating of the liquefied usage gas from the purification vessel, and
   a dispensing conduit for dispensing a purified usage gas.

9. The plant as claimed in claim 8, wherein a regulator which draws off the gas phase from the purification vessel until the internal pressure in the purification vessel corresponds to the vapor pressure of the usage gas at the prevailing temperature in the purification vessel is provided on the extractor.

10. The plant as claimed in claim 8, wherein the usage gas is C4-nitrile (2,3,3,3-tetrafluoro-2-(trifluoromethyl) propanenitrile) and/or C5-ketone (1,1,1,3,4,4,4-hetpafluoro-3-(trifluoromethyl) butan-2-one), and the gas mixture comprises at least one or more of the following secondary gases: oxygen, nitrogen and/or carbon dioxide.

* * * * *